(12) United States Patent
Fan et al.

(10) Patent No.: US 12,085,762 B2
(45) Date of Patent: Sep. 10, 2024

(54) OPTICAL WAVEGUIDE DEVICE FOR IMAGE DISPLAY AND DISPLAY DEVICE HAVING THE SAME

(71) Applicant: JIAXING UPHOTON OPTOELECTRONICS TECHNOLOGY CO., LTD., Tongxiang (CN)

(72) Inventors: Zhentao Fan, Tongxiang (CN); Xingming Zhao, Tongxiang (CN); Kehan Tian, Tongxiang (CN)

(73) Assignee: JIAXING UPHOTON OPTOELECTRONICS TECHNOLOGY CO., LTD., Tongxiang (CN)

(*) Notice: Subject to any disclaimer, the term of this patent is extended or adjusted under 35 U.S.C. 154(b) by 0 days.

(21) Appl. No.: 18/489,196

(22) Filed: Oct. 18, 2023

(65) Prior Publication Data
US 2024/0134205 A1 Apr. 25, 2024

(30) Foreign Application Priority Data
Oct. 21, 2022 (CN) .......................... 202211293936.9

(51) Int. Cl.
*G02B 6/34* (2006.01)
*G02B 27/01* (2006.01)

(52) U.S. Cl.
CPC ........... *G02B 6/34* (2013.01); *G02B 27/0172* (2013.01)

(58) Field of Classification Search
CPC ............................. G02B 6/34; G02B 27/0172
See application file for complete search history.

(56) References Cited

U.S. PATENT DOCUMENTS

| 2011/0019258 A1* | 1/2011 | Levola ............... G02B 27/0081 359/238 |
| 2022/0283377 A1 | 9/2022 | Popovich et al. |
| 2022/0357578 A1* | 11/2022 | Wei ....................... G02B 6/0016 |

FOREIGN PATENT DOCUMENTS

| CN | 111880304 A | 11/2020 |
| CN | 111736336 A | 11/2021 |

(Continued)

OTHER PUBLICATIONS

Extended European Search Report issued in corresponding European Application No. 23204979.1, dated May 13, 2024, pp. 1-8.

*Primary Examiner* — Michael P Mooney
(74) *Attorney, Agent, or Firm* — HAUPTMAN HAM, LLP

(57) ABSTRACT

The application discloses an optical waveguide device for image display and a display device. The optical waveguide device comprises a coupling-in grating and a coupling-out grating provided on a waveguide substrate. The coupling-out grating is used to couple, at least a portion of light propagating into it along an input direction, out of the waveguide substrate, and has a receiving end located upstream and a coupling-out end located downstream along the input direction. The receiving end is divided into a first grating area, a second grating area and a blank area between the first and second grating areas in a width direction perpendicular to the input direction. The blank area can prevent central light from being prematurely diffracted and splitted by the coupling-out grating, thereby reducing the loss of light energy while ensuring effective coupling-out into an eyebox range, maximizing coupling-out efficiency, and improving the optical effect.

18 Claims, 12 Drawing Sheets

(56) References Cited

FOREIGN PATENT DOCUMENTS

| | | |
|---|---|---|
| CN | 113777707 A | 12/2021 |
| WO | 2021120981 A1 | 6/2021 |
| WO | 2022159716 A1 | 7/2022 |

\* cited by examiner

OPTICAL WAVEGUIDE DEVICE FOR IMAGE DISPLAY AND DISPLAY DEVICE HAVING THE SAME

TECHNICAL FIELD

The present disclosure relates to a display technology based on diffraction, and particularly to an optical waveguide device for image display and a display device having the optical waveguide device.

BACKGROUND

With the development of science and technology, AR (Augmented Reality) technology, as a very intelligent and portable display technology, is slowly coming to the public. Its main feature is to superimpose a virtual picture on a real scene so that people can watch the real scene while watching the virtual picture.

An optical waveguide device is currently a mainstream solution for realizing AR display, in which waveguide gratings are provided on a waveguide substrate, and the waveguide gratings comprise a coupling-in grating and a coupling-out grating, and in some cases, further comprise a deflection grating. The coupling-in grating couples incident light carrying image information into the waveguide substrate. The coupling-out grating makes the light carrying image information to propagate and expand, and at the same time couples the light out of the waveguide substrate to form a coupled-out light field. An eye receives light from the coupled-out light field so that, for example, an image carried by the incident light can be observed.

Partitioning of a coupling-out grating in an optical waveguide device used for image display can help improve the light coupling-out efficiency and the uniformity of the outgoing light field. In some existing partitioning technologies, there are regular-shaped partitions as well as random partitions. These partitioning methods can improve the optical effect of the waveguide to a certain extent. However, these partitioning methods do not consider the influence of a position of an eyebox. In fact, it is desirable that the energy transmitted and coupled out of the optical waveguide device be concentrated in the eyebox as much as possible, thus maximizing the energy entering the eye. Therefore, the optical waveguide device for image display still needs to be further improved.

SUMMARY

The object of the present disclosure is to provide an optical waveguide device for image display and a display device having the optical waveguide device, which can at least partly address the problems in the prior art.

According to one aspect of the present disclosure, an optical waveguide device for image display is provided, which comprises a waveguide substrate and a coupling-in grating and a coupling-out grating provided on the waveguide substrate, wherein, the coupling-in grating is configured to couple light carrying image information into the waveguide substrate so that it can propagate through total internal reflection; the coupling-out grating is used to couple at least a portion of light, which propagates thereinto from the coupling-in grating along an input direction directly or through a deflection grating, out of the waveguide substrate by diffraction, and has a receiving end located upstream along the input direction and a coupling-out end located downstream along the input direction, the receiving end is used to receive the light from the coupling-in grating and guide the light to propagate to the coupling-out end, and the coupling-out end is used to couple out the light toward an eyebox while guiding the propagation of the light, wherein the receiving end is divided into three areas, which comprise a first grating area, a second grating area and a blank area between the first grating area and the second grating area in a width direction perpendicular to the input direction.

In some embodiments, an eyebox projection area is obtained by projecting the eyebox onto the coupling-out grating, and the light from the coupling-in grating propagates to the coupling-out grating directly or via the deflection grating, wherein: when the light from the coupling-in grating propagates to the coupling-out grating via the deflection grating, a center connecting line connecting a center of the deflection grating and a center of the coupling-out end or the eyebox projection area passes through the blank area; and when the light from the coupling-in grating directly propagates to the coupling-out grating, a center connecting line connecting a center of the coupling-in grating and a center of the coupling-out end or the eyebox projection area passes through the blank area.

Advantageously, the blank area has a first average width in the width direction, the receiving end has a second average width in the width direction, and the first average width is less than 50% of the second average width.

Advantageously, the first average width is in a range of 15%~40% of the second average width.

Advantageously, the blank area has a width that decreases along the input direction.

Advantageously, the blank area has a shape of a rectangle, a trapezoid, a triangle, or a shape with stepped sides.

Advantageously, the first grating area and the second grating area are separated from each other so that the blank area is open to the light from the coupling-in grating.

In some embodiments, the coupling-in grating is substantially centered with respect to the coupling-out end of the coupling-out grating, and the first grating area and the second grating area are symmetrical about the center connecting line.

In some embodiments, the coupling-out end of the coupling-out grating has a substantially quadrilateral shape, the quadrilateral shape has two top sides located upstream and downstream along the input direction, two lateral sides connecting between the two top sides, and a first corner and a second corner located upstream along the input direction, the coupling-out grating is configured in such a way that the lateral sides of the quadrilateral shape are inclined relative to the input direction so that the first corner of the quadrilateral shape close to the first grating area is farther away from the center connecting line than the second corner of the quadrilateral shape close to the second grating area.

Advantageously, taking the center connecting line as a dividing line, the blank area is divided into a first blank area close to the first grating area and a second blank area close to the second grating area, and an average width of the first blank area is greater than an average width of the second blank area.

Advantageously, in the input direction, a length of the first grating area is smaller than a length of the second grating area.

In some embodiments, input light propagates to the coupling-out grating along a total reflection propagation path that gradually diverges relative to a centerline in a plane of the waveguide substrate, and the centerline is parallel to the input direction and passes through the blank area.

In some embodiments, the coupling-in grating is substantially centered with respect to the coupling-out end of the coupling-out grating, and the first grating area and the second grating area are symmetrical about the centerline.

In some embodiments, taking the center connecting line as a dividing line, the blank area is divided into a first blank area close to the first grating area and a second blank area close to the second grating area, an average width of the first blank area is greater than an average width of the second blank area, and the position of the first grating area is offset backward relative to the second grating area in the input direction.

Advantageously, the receiving end has a width which gradually increases along the input direction.

Advantageously, the receiving end has a top end located upstream and a bottom end located downstream along the input direction, and a width of the bottom end is smaller than a width of the coupling-out end.

Advantageously, a first one-dimensional grating is formed in the first grating area, a second one-dimensional grating is formed in the second grating area, and a grating vector of the first one-dimensional grating and a grating vector of the second one-dimensional grating are inclined toward mutually opposite directions with respect to the input direction.

In some embodiments, the coupling-in grating is a one-dimensional grating.

According to another aspect of the present disclosure, a display device is provided, which comprises the optical waveguide device.

In some embodiments, the display device is a near-eye display device and comprises a lens and a frame for holding the lens close to the eye, the lens comprising the optical waveguide device.

In some embodiments, the display device is an augmented reality display device or a virtual reality display device.

According to embodiments of the present disclosure, the blank area at the receiving end of the coupling-out grating is used to receive light at the roughly middle position of the light from the coupling-in grating, thereby reducing the loss of light energy while ensuring effective coupling-out into an eyebox range, thereby maximizing coupling-out efficiency and improving the optical effect of the optical waveguide device.

BRIEF DESCRIPTION OF THE DRAWINGS

Other features, objects, and advantages of the present disclosure will become more apparent by reading the following detailed description of non-limitative embodiments with reference to the following drawings.

DETAILED DESCRIPTION

Figure 1:
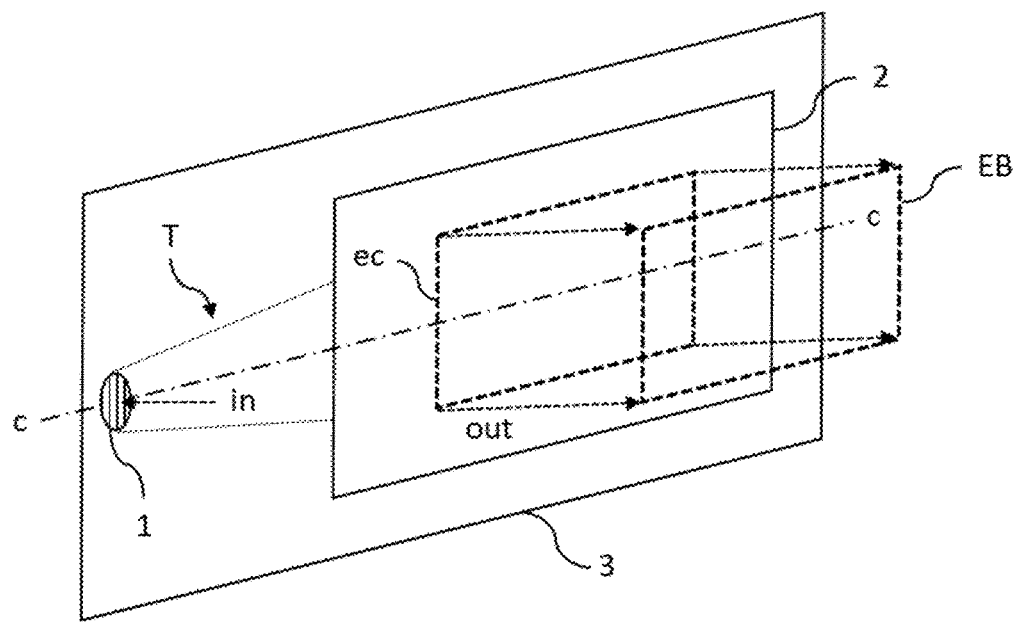
FIG. 1 is a schematic perspective illustration of light input and output of an optical waveguide device for image display.

The present disclosure will be further described in detail in conjunction with drawings and embodiments. It will be understood that the specific embodiments described herein are only used to explain the related disclosure, but not to limit the disclosure. For the convenience of description, only the parts related to the disclosure are shown in the drawings. It should be noted that the embodiments in the present disclosure and the features of the embodiments may be combined with each other without conflict.

The optical waveguide device of present disclosure is made based on the in-depth study and understanding of the propagation path of light in an optical waveguide device and the relationship between the propagation path and the eyebox. For ease of understanding, this will first be introduced with reference to FIGS. 1 to 3.

FIG. 1 schematically shows light input and output of an optical waveguide device in a three-dimensional manner. The optical waveguide device shown in FIG. 1 is formed with a coupling-in grating 1 and a coupling-out grating 2. Incident light carrying image information irradiates on the coupling-in grating 1, and with the diffraction effect of the coupling-in grating 1, forms the input light that propagates in a waveguide substrate 3 toward the coupling-out grating 2 through total internal reflection. The input light propagates to the coupling-out grating 2 in a plane of the waveguide substrate 3 along a total reflection propagation path T that gradually diverges relative to a centerline c-c. The centerline c-c corresponds to a propagation path of the light in the center of the field of view of the incident light in the waveguide substrate 3. The dashed box EB shown in FIG. 1 represents an eyebox, and the eyebox EB is at a certain distance from a surface of the waveguide substrate 3 (that is, an exit pupil distance); the light coupled out from the coupling-out grating 2 for restoring the image information is projected into the eyebox EB at a predetermined angle relative to the surface of the waveguide substrate 3; and the dashed box ec shown in FIG. 1 represents an effective coupling-out area capable of projecting light into the eyebox EB at the predetermined angle. Areas other than the effective coupling-out area of the coupling-out grating can also couple light out of the waveguide substrate, but the light cannot enter the eyebox EB, and thus cannot be used for desired image display, resulting in a waste of light energy. It will be understood that, corresponding to different image points in the image, both the predetermined angle and the effective coupling-out area are variable.

For ease of illustration, in the other figures, the eyebox EB is shown only in a planar projection position of the eyebox on the coupling-out grating.

Figure 2:
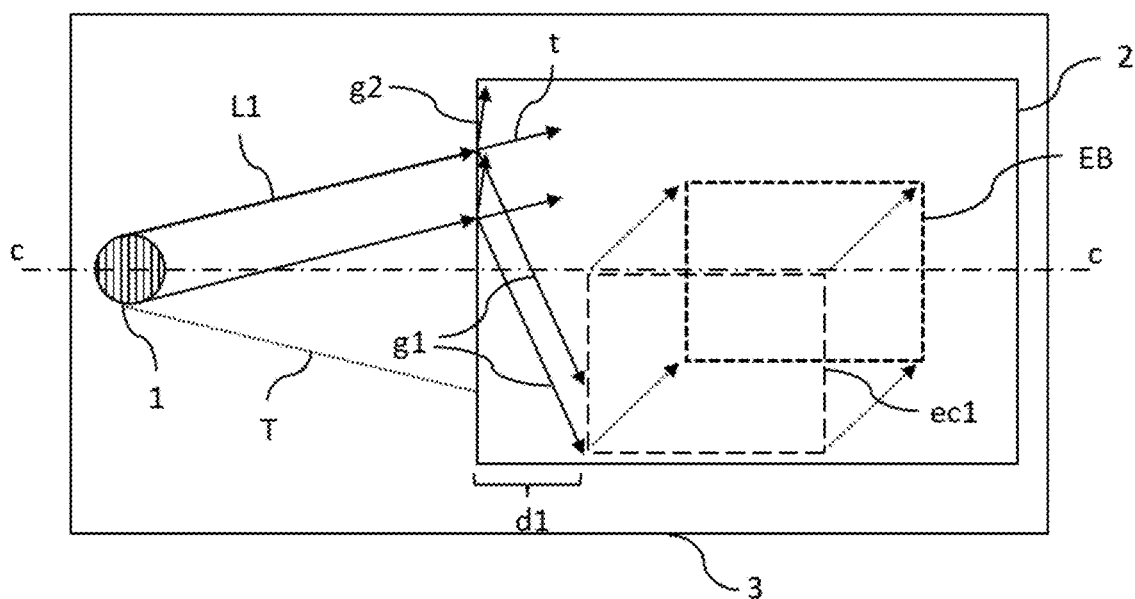
FIG. 2 schematically shows the light propagation situation after light located at lateral positions of a total reflection propagation path of the light from a coupling-in grating enters a coupling-out grating.

FIG. 2 schematically shows the light propagation situation after light L1, which is located at the lateral position of the total reflection propagation path of the light from the coupling-in grating, enters the coupling-out grating. Taking the coupling-out grating 2 as a two-dimensional grating as an example, as shown in FIG. 2, after the light L1 enters the coupling-out grating 2, it forms a first split light g1, a second split light g2, and a total reflection light t propagating in an original direction, with the diffraction effect of different grating vectors. It can be seen from FIG. 2 that the light L1 in the coupling-out grating 2 needs to travel at least a distance d1 along a direction of the centerline to cover the effective coupling-out area ec1 corresponding to the light L1.

Figure 3:
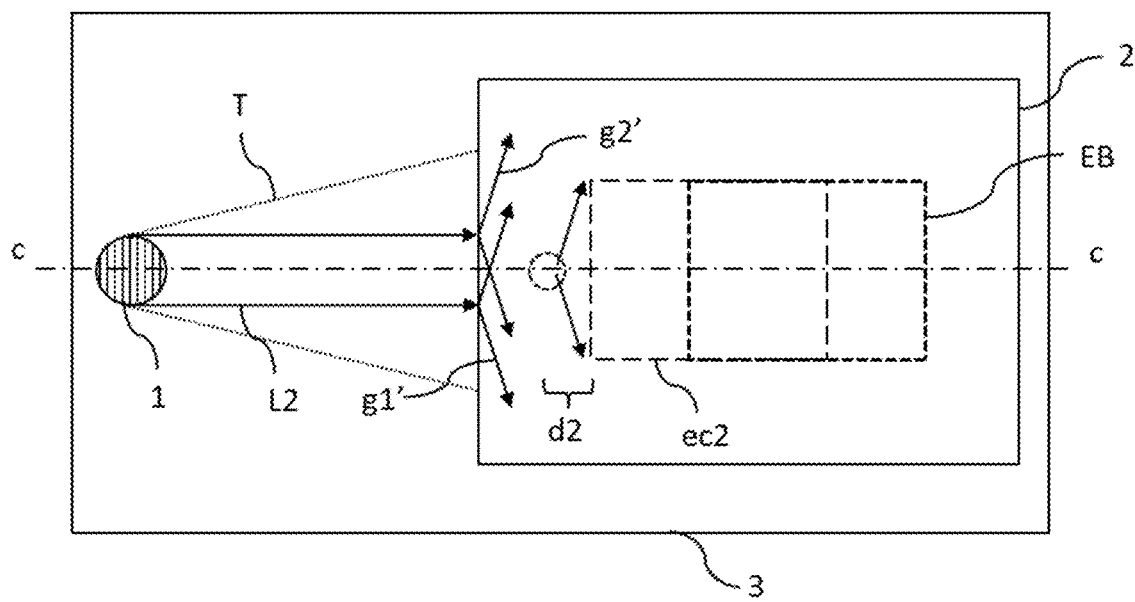
FIG. 3 schematically shows the light propagation situation after light located centrally in the total reflection propagation path of the light from a coupling-in grating enters a coupling-out grating.

FIG. 3 schematically shows the light propagation situation after light L2, which is located centrally in the total reflection propagation path of the light from the coupling-in grating, enters the coupling-out grating. After the light L2 enters the coupling-out grating, it forms a first split light g1', a second split light g2' (see FIG. 3), and a total reflection light t (not shown) propagating in an original direction, with the diffraction effect of different grating vectors. It can be seen from FIG. 3 that the light L2 can cover the effective coupling-out area ec2 corresponding to the light L2 by only traveling a distance d2 along a direction of the centerline in the coupling-out grating 2.

From the above research and analysis, it is further found that if the light located centrally in the total reflection propagation path of the light from the coupling-in grating enters the coupling-out grating for the first time at the position indicated by a dashed circle in FIG. 3, the light can propagate and cover the effective coupling-out area ec2 with the diffraction effect of the coupling-out grating, and can reduce the light energy wasted due to the generated first split light g1' and second split light g2' before reaching the position indicated by the dashed circle.

Based on the above research and findings, an optical waveguide device for image display is provided according to an embodiment of the present disclosure, wherein a coupling-out grating has a receiving end located upstream and a coupling-out end located downstream along an input direction of light from a coupling-in grating. The receiving end is used to receive the light from the coupled-in grating and guide the light to propagate to the coupling-out end, and the coupling-out end is used to couple the light toward the eyebox while guiding the propagation of the light, wherein the receiving end is divided into three areas, and the three areas comprise a first grating area, a second grating area and a blank area between the first grating area and the second grating area in a width direction perpendicular to the input direction. According to embodiments of the present disclosure, the blank area is used to receive light at approximately the middle position of the light from the coupling-in grating (for example, light propagating along the centerline c-c), thereby reducing the loss of light energy while ensuring effective coupling-out into an eyebox range, maximally improving the coupling-out efficiency and improving the optical effect of the optical waveguide device.

An optical waveguide device according to embodiments of the present disclosure will be described in detail below with reference to the accompanying drawings.

Figure 4:
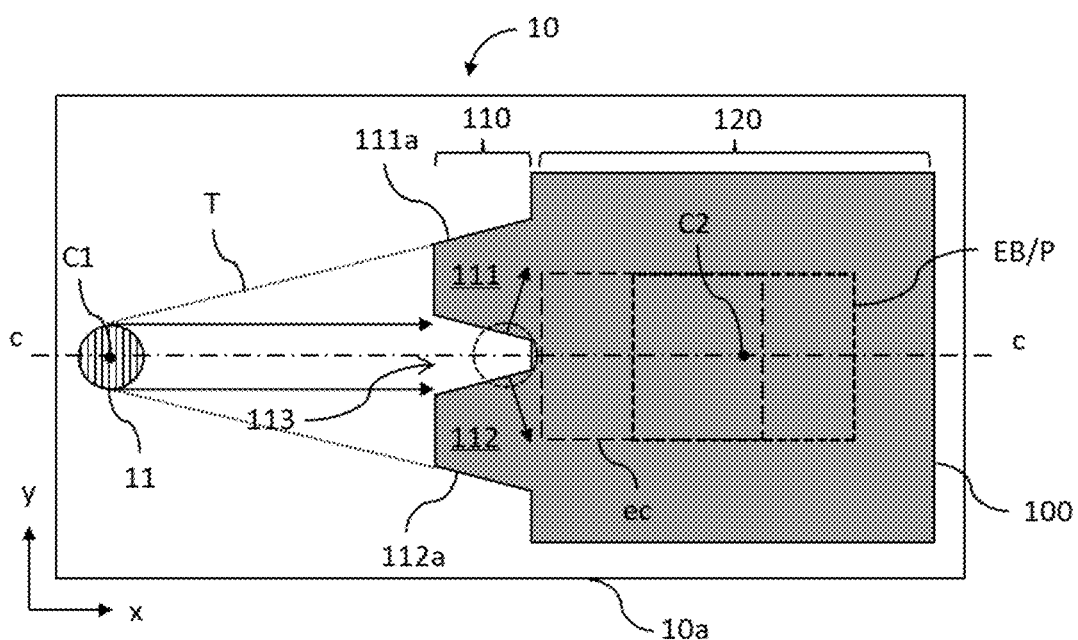
FIG. 4 is a schematic view of an example of an optical waveguide device for image display according to Embodiment 1 of the present disclosure.

FIG. 4 is a schematic view of an example of the optical waveguide device for image display according to Embodiment 1 of the present disclosure. As shown in FIG. 4, an optical waveguide device 10 according to Embodiment 1 of the present disclosure comprises a waveguide substrate 10a and a coupling-in grating 11 and a coupling-out grating 100 provided on the waveguide substrate 10a.

The coupling-in grating 11 is configured to couple light carrying image information into the waveguide substrate 10a so that it can propagate through total internal reflection. The light propagates to the coupling-out grating 100 along a total reflection propagation path that gradually diverges relative to a centerline c-c in a plane of the waveguide substrate 10a.

The coupling-out grating 100 is used to couple at least a portion of light, which propagates thereinto from the coupling-in grating 11 along an input direction (the x direction shown in the figure), out of the waveguide substrate 10a by diffraction. Here, the "input direction" can be determined according to the centerline c-c of the total reflection propagation path along which the light propagates to the coupling-out grating. Although the propagation direction of the light from the coupling-in grating has a certain degree of divergence when propagating toward the coupling-out grating, the "input direction" determined by the above-mentioned centerline can generally represent the direction of light input to the coupling-out grating.

According to embodiments of the present disclosure, the coupling-out grating 100 has a receiving end 110 located upstream and a coupling-out end 120 located downstream along the input direction (x direction), the receiving end 110 is used to receive light from the coupling-in grating 11 and guide the light to propagate to the coupling-out end 120, and the coupling-out end is used to couple the light out toward an eyebox EB while guiding the propagation of the light. As shown in FIG. 4, according to embodiments of the present disclosure, the receiving end 110 is divided into three areas, the three areas comprise a first grating area 111, a second grating area 112, and a blank area 113 between the first grating area 111 and the second grating area 112 in a width direction (y direction) perpendicular to the input direction.

According to embodiments of the present disclosure, since the receiving end 110 of the coupling-out grating 100 is divided into three areas: the first grating area 111, the second grating area 112, and the blank area 113; and the blank area 113 is set between the first grating area 111 and the second grating area 111. Thus, when the light from the coupling-in grating 11 is received by the coupling-out grating 100, the light in the central part of the total reflection propagation path will enter the coupling-out grating 100 through the blank area 113. As shown in FIG. 4, the centerline c-c of the total reflection propagation path passes through the blank area 113.

From the research and analysis introduced above, it can be known that the setting of the blank area can prevent light in the central part from being prematurely diffracted and split by the coupling-out grating, which causes a considerable amount of light energy to fail to enter an effective coupling-out area ec, thereby reducing the loss of light energy while ensuring effective coupling-out into the eyebox range, so as to maximize coupling-out efficiency, and improve the optical effect of the optical waveguide device.

In the example shown in FIG. 4, the eyebox EB is projected on the coupling-out grating 100 to obtain an eyebox projection area P (in the figure, the eyebox EB and its eyebox projection area P are coincident), and a center connecting line connecting a center C1 of the coupling-in grating 11 and a center C2 of the coupling-out end 120 or the eyebox projection area P passes through the blank area 113. Depending on the range of field of view angle of the image to be displayed, the center connecting line may coincide or substantially coincide with the centerline c-c.

According to the present embodiment, preferably, the coupling-in grating 11 is roughly centered with respect to the coupling-out end 120 of the coupling-out grating 100, and the first grating area 111 and the second grating area 112 are symmetrical about the above-mentioned center connecting line.

Preferably, the receiving end 110 has a width gradually increasing along the input direction (x direction). Specifically, outer edges of the receiving end 110 (that is, an outer edge 111a of the first grating area 111 and an outer edge 112a of the second grating area 112 shown in FIG. 4) substantially coincide with the edges of the total reflection propagation path T or are slightly shifted outward relative to the latter, so as to effectively receive light from the coupled-in grating, and at the same time reduce the area of the grating and reduce the manufacturing cost.

In addition, the receiving end 110 has a top end (an end facing the coupling-in grating 11) located upstream and a bottom end (an end adjoining the coupling-out end) located downstream along the input direction (x direction); preferably, as shown in FIG. 4, the width of the bottom end of the receiving end 110 is smaller than the width of the coupling-out end 120. In this way, the grating area in the coupling-out grating 100 that are not useful for desired image display, can be reduced as much as possible, thereby reducing the manufacturing cost of the optical waveguide device.

It should be understood that the present disclosure is not limited to the situation where the width of the receiving end gradually increases along the input direction and/or the width of the bottom end of the receiving end is smaller than the width of the coupling-out end; in other words, according to embodiments of the present disclosure, when the light from the coupling-in grating can be effectively received, the width of the receiving end of the coupling-out grating can be kept uniform or even reduced along the input direction, as well as that the width of the bottom end of the receiving end can be greater than or equal to the width of the coupling-out end. For example, the coupling-out grating may have a uniform width throughout, thus having a generally rectangular outer profile.

Further, by controlling the ratio of the width of the blank area in the receiving end, the coupling-out efficiency of light at different positions in the eyebox and the uniformity of light intensity distribution of the observed image can be adjusted. Advantageously, the blank area has a first average width in the width direction (y direction shown in the figure), the receiving end has a second average width in the width direction, and the first average width is less than 50% of the second average width. Preferably, the first average width is in the range of 15% to 40% of the second average width, so that the average efficiency over the field of view can be significantly improved, and good uniformity can also be taken care of.

Preferably, the blank area has a width that decreases along the input direction.

In order to illustrate the technical effect of the optical waveguide device according to embodiments of the present disclosure in terms of light coupling-out efficiency and uniformity and to illustrate the influence of the shape and size of the blank area, data examples of simulation calculation will be given below.

(Data Examples)

In the data examples, the incident beam irradiating on the coupling-in grating 11 has a wavelength of 530 nm, a beam diameter of 4 mm, a beam center right on the center of the coupling-in grating, and a range of field of view angle in which: a field of view angle FOVX which is formed with respect to the normal of the XY plane in the direction around the X axis (which is parallel to the input direction/x direction) is −12~12°, and a field of view angle FOVY, which is formed with respect to the normal of the XY plane in the direction around the Y axis (which is parallel to the width direction/y direction) is −9°~9°.

Figure 5:
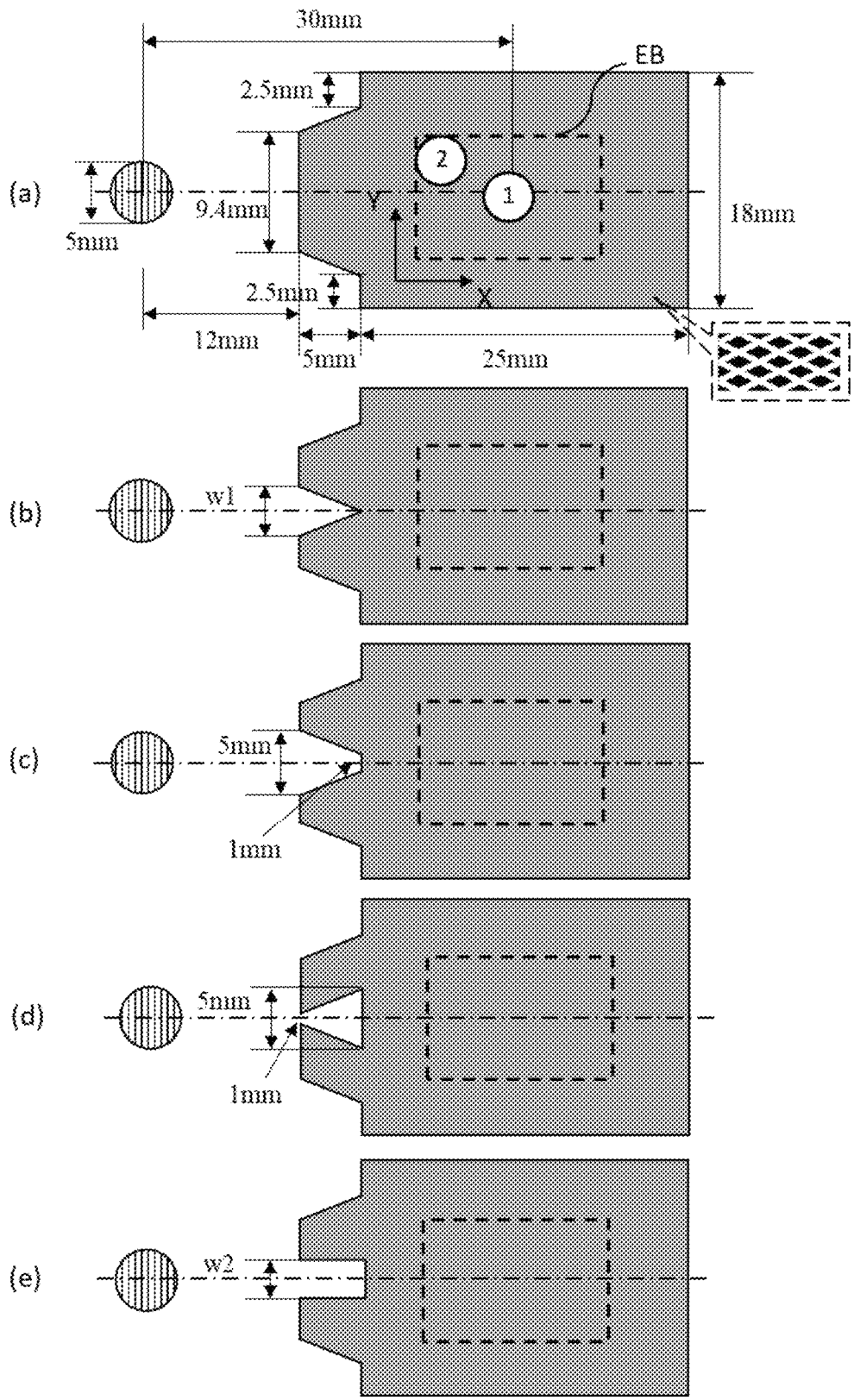
FIG. 5 shows five grating configurations of the optical waveguide device on which the simulation calculations are based.
Figure 6:
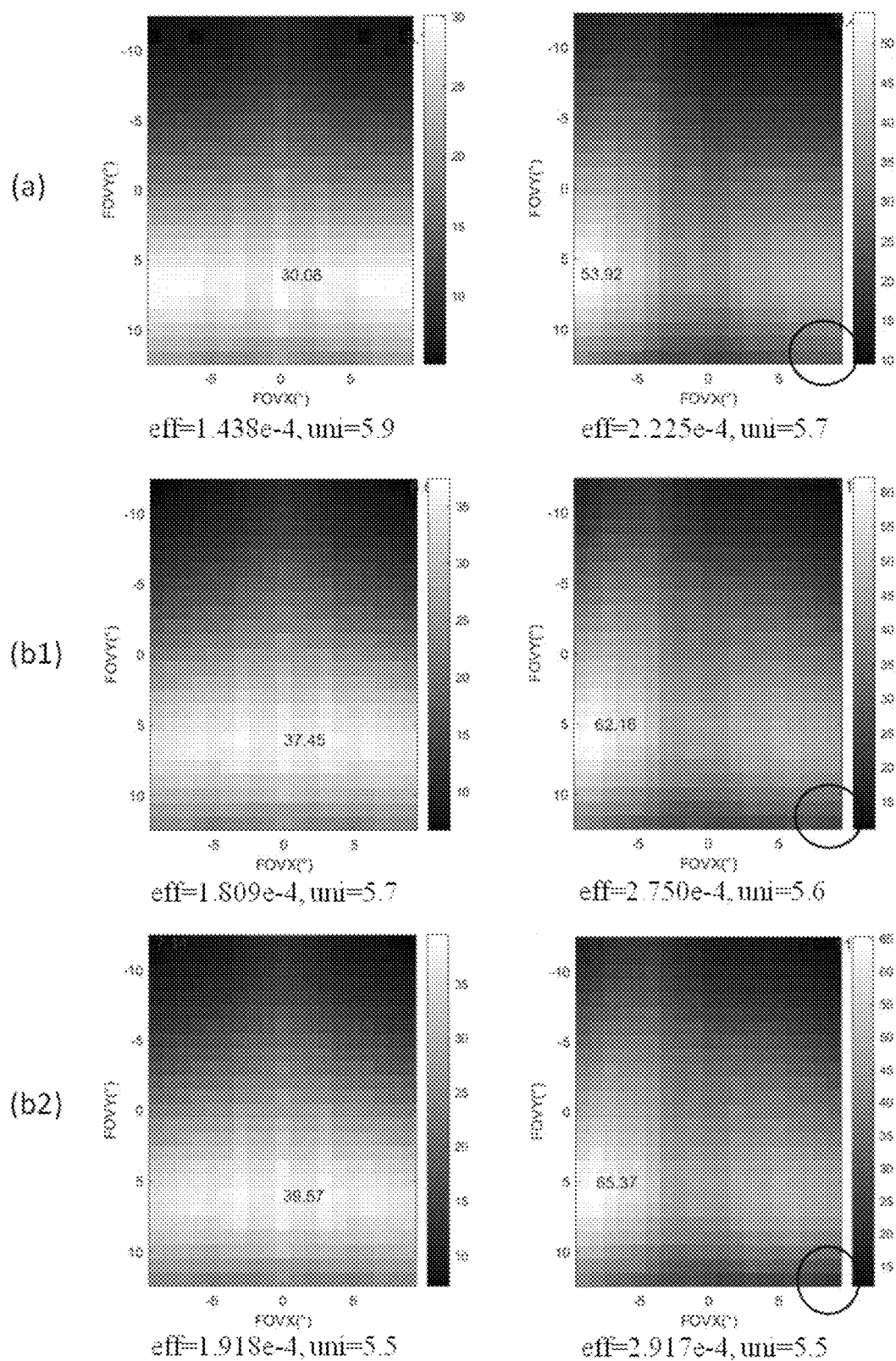
FIG. 6, FIG. 7, FIG. 8, and FIG. 9 respectively show simulation diagrams of light intensity distribution within the range of field of view angle obtained at the center position and the front corner position of the eyebox with different grating configurations.

In the data examples, the waveguide substrate has a refractive index of 1.915 and a thickness of 1 mm; the coupling-in grating is a one-dimensional grating with a grating period of 420 nm; the coupling-out grating is a two-dimensional grating with a rhombic hole-shaped optical unit structure (as shown in the schematic enlarged view in the dashed line lead-out box in FIG. 5), a lattice period of 840 nm×392 nm, a side length of the rhombus of 308 nm, an acute vertex of 50° and a depth of 57 nm. After calculation, the total reflection propagation path T of the beam that is incident into and coupled by the coupling-in grating and propagates toward the coupling-out grating has a width of 6.5 mm at the top end (an end located upstream along the input direction) of the receiving end of the coupling-out grating, a width of 7.6 mm at the bottom end (an end located downstream along the input direction) of the receiving end, and an average width (third average width) of 7.05 mm.

FIG. 5 shows five different grating configurations (a), (b), (c), (d), and (e), which differ from each other only in the blanking area at the receiving end of the coupling-out grating. Specifically, in the grating configuration (a), the receiving end of the coupling-out grating does not have a blank area in the middle; in the grating configurations (b), (c), (d), and (e), the blank areas have a triangular shape with a large top and a small bottom, a trapezoidal shape with a large top and a small bottom, a trapezoidal shape with a small top and a large bottom, and a rectangular shape, respectively. In the description of the above shape, the direction toward the coupling-in grating is referred to as "top", and the direction toward the coupling-out end of the coupling-out grating is referred to as "bottom". The grating configurations (b), (c), (d), and (e) have the same dimensions as shown in the grating configuration (a), and will not be repeated here.

In the data examples, assuming the size of the eyebox EB is 15 mm×10 mm, an exit pupil distance (a distance from the eyebox to the waveguide substrate) is 18 mm, and a diameter of an eye pupil is 4 mm. For optical waveguide devices with different grating configurations as shown in FIG. 5, different w1 and w2 parameter values are used to calculate the optical effect obtained by the eyes at the center position of the eyebox (see the position marked with "①" in FIG. 5) and at the front corner of the eyebox near the receiving end (see the position marked with the mark "②" in FIG. 5), comprising average coupling-out efficiency and non-uniformity. Indices for average coupling-out efficiency and non-uniformity at the center position and the front corner position of the eyebox with different grating configurations calculated by simulation are shown in Table 1:

FIG. 6, FIG. 7, FIG. 8, and FIG. 9 show the simulation diagrams of light intensity distribution within the range of field of view angle with different grating configurations, respectively. The diagram on the left in each figure shows the light intensity distribution obtained at the center position

TABLE 1

| Config. | Width Value | Width Ratio 1 | Width Ratio 2 | Center Position of Eyebox | | Front Corner Position of Eyebox | | Efficiency at Corner of Field of View |
|---|---|---|---|---|---|---|---|---|
| | | | | Average Efficiency (eff) | Non-uniformity (uni) | Average Efficiency (eff) | Non-uniformity (uni) | |
| (a) | / | / | / | 1.438e−4 | 5.9 | 2.225e−4 | 5.7 | 2.22e−4 |
| (b1) | w1 = 4 mm; First average width = 2 mm | 28.5% | 18% | 1.809e−4 | 5.7 | 2.750e−4 | 5.6 | 2.21e−4 |
| (b2) | w1 = 6 mm; First average width = 3 mm | 43% | 27% | 1.918e−4 | 5.5 | 2.917e−4 | 5.5 | 2.08e−4 |
| (c) | First average width = 3 mm | 43% | 27% | 1.956e−4 | 5.7 | 2.958e−4 | 5.5 | 1.99e−4 |
| (d) | First average width = 3 mm | 43% | 27% | 1.957e−4 | 5.7 | 2.917e−4 | 5.5 | 1.55e−4 |
| (e1) | w2 = 3 mm; First average width = 3 mm | 43% | 27% | 1.998e−4 | 5.8 | 2.993e−4 | 5.5 | 1.75e−4 |
| (e2) | w2 = 4 mm; First average width = 4 mm | 57% | 36% | 2.105e−4 | 5.6 | 3.154e−4 | 5.3 | 1.48e−4 |
| (e3) | w2 = 5 mm; First average width = 5 mm | 71% | 45% | 2.181e−4 | 5.2 | 3.263e−4 | 6.4 | 1.18e−4 |
| (e4) | w2 = 5.5 mm; First average width = 5.5 mm | 79% | 49% | 2.207e−4 | 5.0 | 3.297e−4 | 8.0 | 1.02e−4 |
| (e5) | w2 = 7.05 mm; First average width = 7.05 mm | 100% | 63% | 2.251e−4 | 4.6 | 3.348e−4 | 17.7 | 0.67e−4 |

In Table 1, configurations (b1) and (b2) both correspond to the grating configuration (b) shown in FIG. 5, with the difference lies in that the width w1 of the triangular shape of the blank area is 4 mm and 6 mm, respectively; and the configurations (e1)~(e5) all correspond to the grating configuration (e) shown in FIG. 5, with the difference lies in that the width w2 of the rectangular shape of the blank area is 3 mm, 4 mm, 5 mm, 5.5 mm, and 7.05 mm, respectively.

In the table, "Width Ratio 1" refers to the ratio of the first average width of the blank area to the third average width of the total reflection propagation path T between the top end and the bottom end of the receiving end of the coupling-out grating; and "Width Ratio 2" refers to the ratio of the first average width of the blank area to the second average width of the receiving end.

In Table 1, "Average Efficiency" is the ratio of the average value of the light intensity at each field of view angle at a corresponding eyebox position to the light intensity of the light coupled into the grating structure. The larger the value of the average efficiency (eff), the higher the coupling-out efficiency at this position of the eyebox; "Efficiency at Corner of Field of View" refers to the average coupling-out efficiency at a corner position of the field of view having a field of view angle FOVX of 11-12° and a field of view angle FOVY of 8-9°; and "Non-uniformity" is the ratio of the highest light intensity value to the lowest light intensity value in the field of view at a corresponding eyebox position. The smaller the value of non-uniformity (uni), the better the uniformity over the field of view at this position of the eyebox.

of the eyebox, and the diagram on the right shows the light intensity distribution obtained at the front corner position of the eyebox. In each figure, the circle in the lower right corner of the diagram on the right roughly indicates a corner position of the field of view where the FOVX is 11-12°, and the FOVY is 8-9°.

For an optical waveguide device, a size range of the eyebox is to be adapted for people with different interpupillary distances and to provide a certain tolerance for eye movement range. For an optical waveguide device with good optical effect, it is expected that relatively high optical coupling efficiency and relatively low non-uniformity can be achieved with a human eye being at different positions in the eyebox. Generally speaking, it is desired that the average efficiency over the field of view at the center position of the eyebox (see the position marked with "①" in FIG. 5) is as high as possible, and the smaller the non-uniformity, the better; while at the same time, it is desired that the field of view at the edge of the eyebox (comprising the front corner of the eyebox, see the position marked with "②" in FIG. 5) will not be too dark.

From Table 1 and the simulation results shown in FIGS. 6 to 9, compared to the grating configuration (a) without a blank area, the grating configuration (b1) has the first average width of the blank area of 2 mm (the width ratio 1 is 28.5% and the width ratio 2 is 18%), an average efficiency at the center position of the eyebox increased by 26%, and an average efficiency at the front corner position of the eyebox increased by 22%. The increasement is obvious, showing a significant improvement in optical effect.

At the same time, it is seen that the larger the first average width of the blank area, the better the average efficiency and uniformity at the center position of the eyebox, and the higher the average efficiency at the front corner position of the eyebox. However, if the first average width of the blank area is too large, the efficiency at corner of field of view ((11°, 8°)~(12°, 9°) field of view efficiency) at the front corner position of the eyebox will be severely reduced, and the non-uniformity will also increase, which will affect application in practice. When the first average width of the blank area in the grating configuration (e4) reaches 5.5 mm (width ratio 1 is 79% and width ratio 2 is 49%), the non-uniformity over the field of view observed at the front corner position of the eyebox begins to deteriorate significantly, and obvious dark areas begin to appear at corners of the field of view. It is generally required that the non-uniformity over the field of view at the corners of the eyebox (comprising the field of view at the front corner of the eyebox) be less than 8 to meet the requirements of good use. Therefore, according to embodiments of the present disclosure, the first average width of the blank area is selected such that the width ratio 1 is less than 75% and the width ratio 2 is less than 50%; preferably, the width ratio 1 is 20%-70%, and the width ratio 2 is 15%-40%. In the case where the parameters of the incident beam to which the optical waveguide device need to be adapted can be determined in advance, it is preferable to determine the first average width of the blank area according to the width ratio 1. In the case where the parameters of the incident beam to be used by the optical waveguide device are not determined, the first average width of the blank area can be determined according to the selected/optimized width ratio 2, which is beneficial for optimizing the blank area with a determined second average width of the receiving end, thereby improving the optical effect of the optical waveguide device. It will be understood that the width of the receiving end affects the size of the grating area of the receiving end, thereby affecting the manufacturing cost, and therefore, optimizing the blank area with a determined width of the receiving end means optimizing the performance of the optical waveguide device while controlling the manufacturing cost, which is very advantageous for the production and manufacturing of the optical waveguide device.

Figure 7:
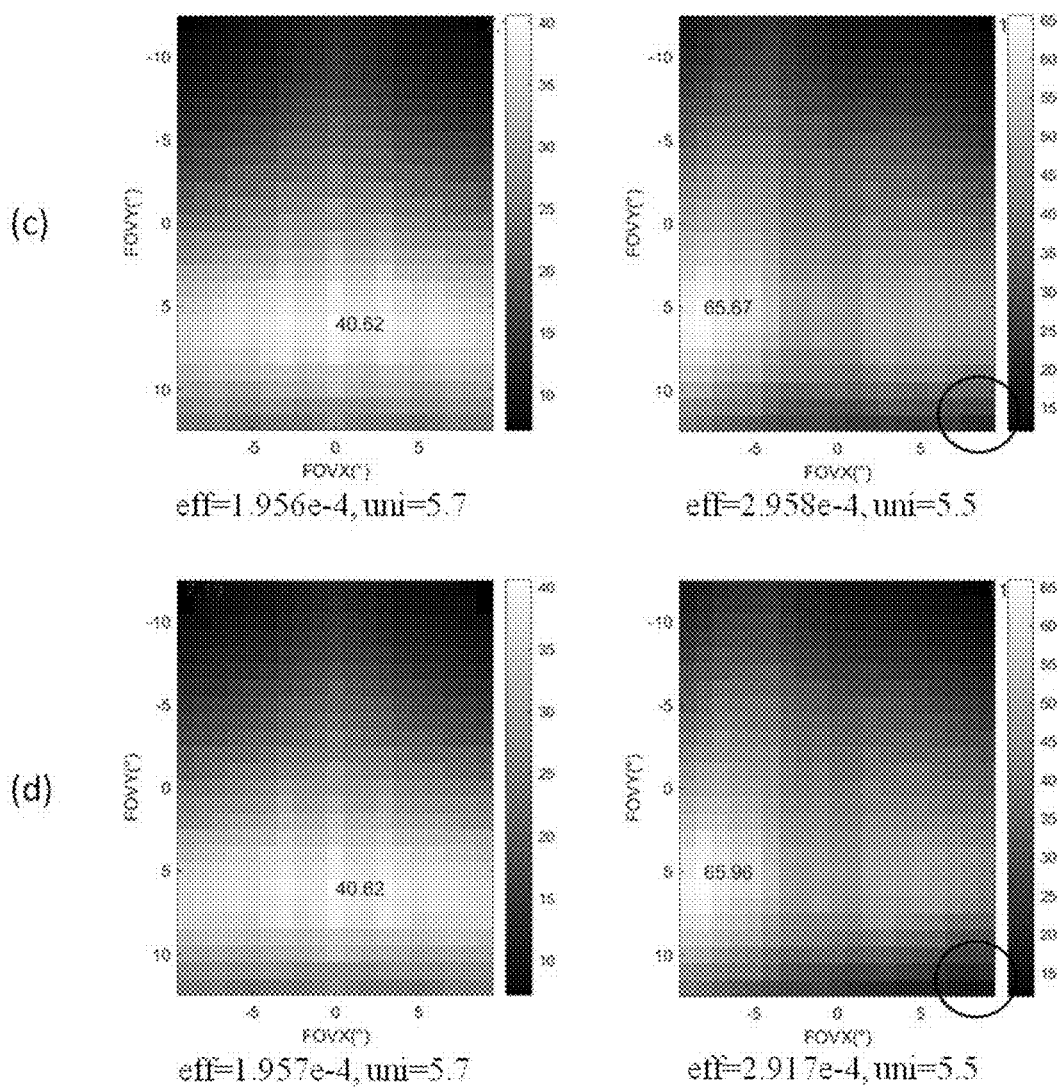
Figure 8:
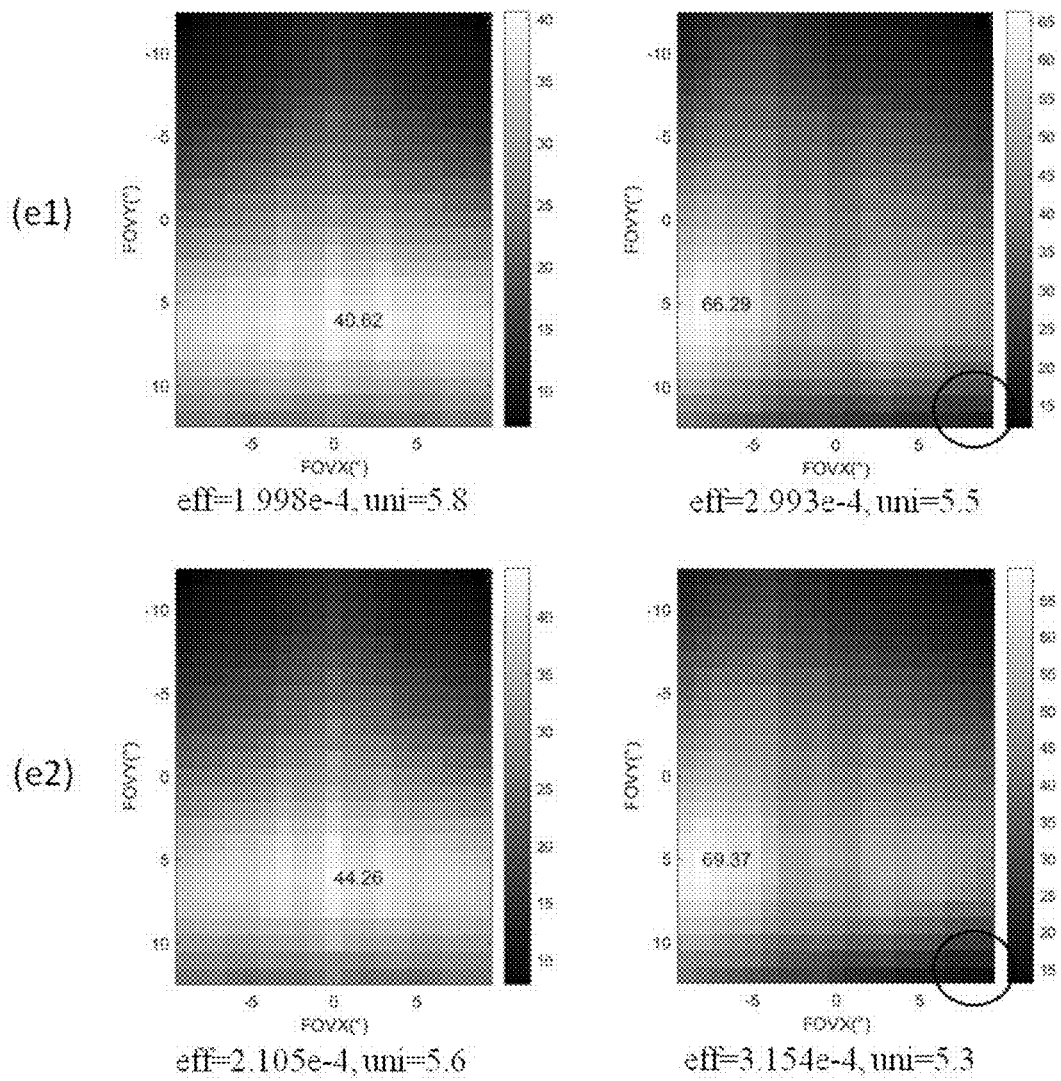
Figure 9:
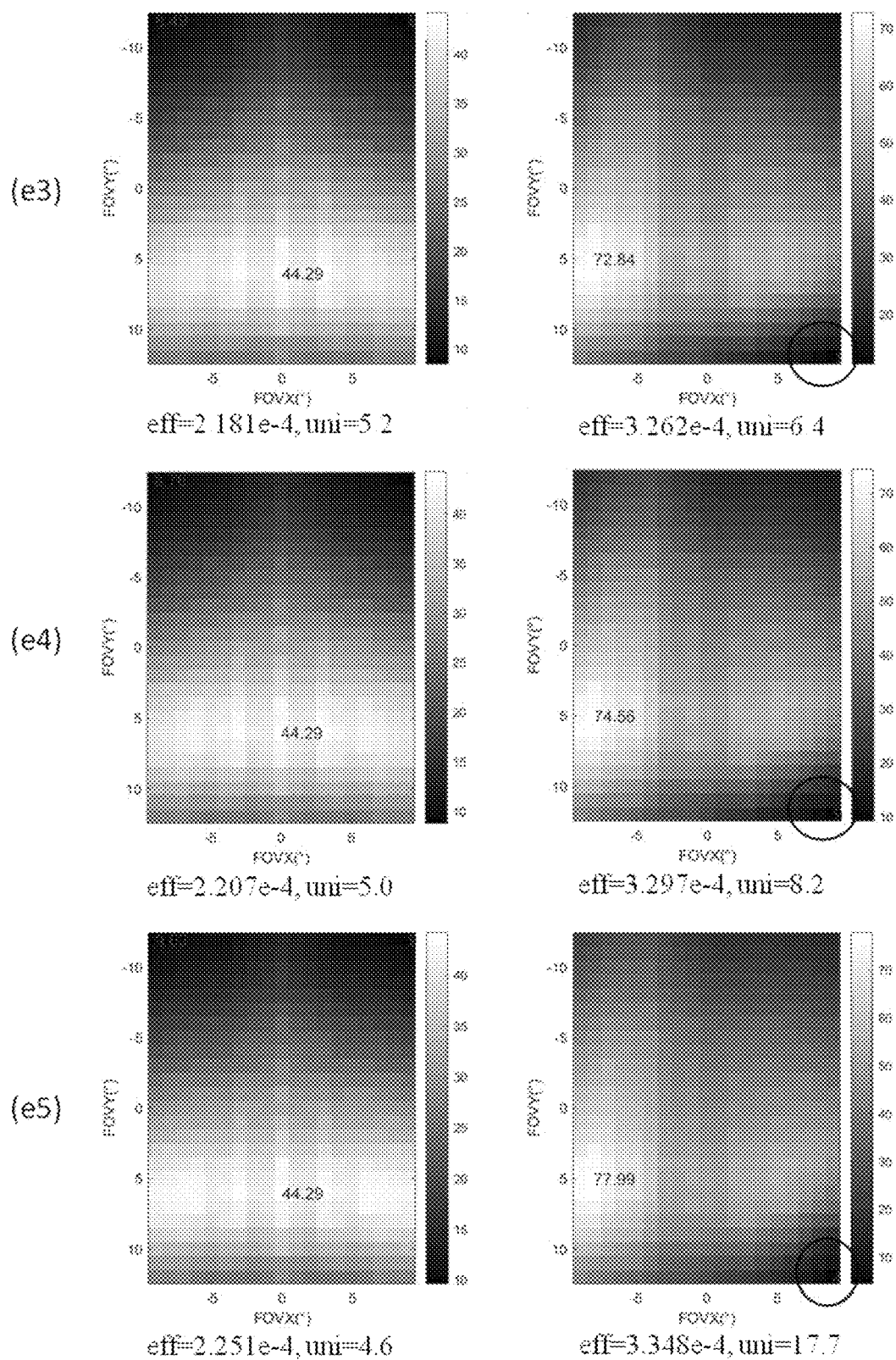

In addition, referring to Table 1 and FIG. 7, it can be seen that for the grating configuration (c) and the grating configuration (d) with the same first average width of the blank area, the average efficiencies over the field of view at the center position of the eyebox and the front corner position of the eyebox are close, and the non-uniformities are also close, but the average efficiencies at the corner position of the field of view (that is, "(11°, 8°)~(12°, 9°) field of view efficiency") obtained at the front corner position of the eyebox are different. Specifically, the grating configuration (c) where the blank area has a trapezoidal shape with a large top and a small bottom, has a higher average efficiency at the corner positions of the field of view discussed above, and therefore the configuration (c) can be considered as being relatively better. In other words, according to embodiments of the present disclosure, it is preferable that the first average width of the blank area decreases along the input direction, which is beneficial for improving the coupling-out efficiency at the corner positions of the field of view.

Figure 10:
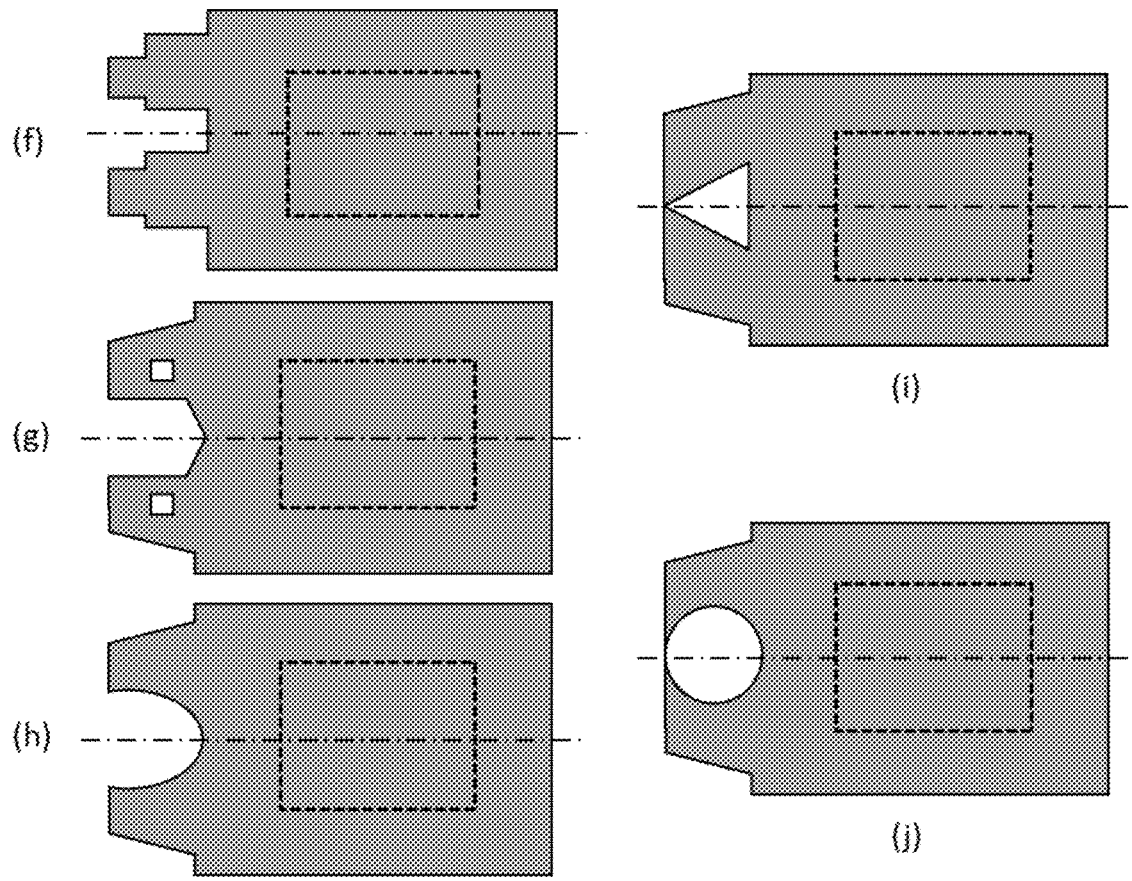
FIG. 10 is a schematic view of different examples of coupling-out gratings that can be used in optical waveguide devices according to embodiments of the present disclosure, where the blank areas have different shapes.

In addition to the blank area shown in FIG. 5 that can be used in the optical waveguide device according to embodiments of the present disclosure, as shown in FIG. 10, in the optical waveguide device according to embodiments of the present disclosure, the blank area can also have a shape with stepped sides (see coupling-out grating figure (f) in FIG. 10), a combination of rectangular and triangular shapes (see coupling-out grating figure (g) in FIG. 10), an arc notch shape (see coupling-out grating figure (h) in FIG. 10). The above blank areas are open towards the light from the coupling-in grating, thereby separating the first grating area from the second grating area at the top of the receiving end of the coupling-out grating. However, in some cases, the blank area can also be formed to be approximately closed at the top end of the receiving end, such as a triangle shape with a small top and a large bottom as shown in figure (i) in FIG. 10 and a circular shape shown in figure (j) that is substantially tangent to the top end.

Figure 11:
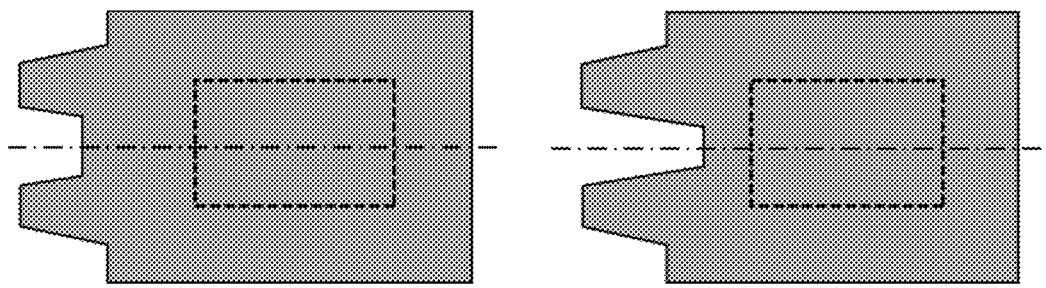
FIG. 11 is a schematic view of different examples of coupling-out gratings that can be used in optical waveguide devices according to embodiments of the present disclosure, where the blank areas have different lengths.

In the optical waveguide devices according to embodiments of the present disclosure, the blank areas at the receiving end of the coupling-out grating can have different lengths in the input direction. For example, as shown in the left figure in FIG. 11, the length of the blank area can be shorter than the length of the entire receiving end; or as shown in the right figure in FIG. 11, the length of the blank area can be longer than the length of the entire receiving end.

Figure 12:
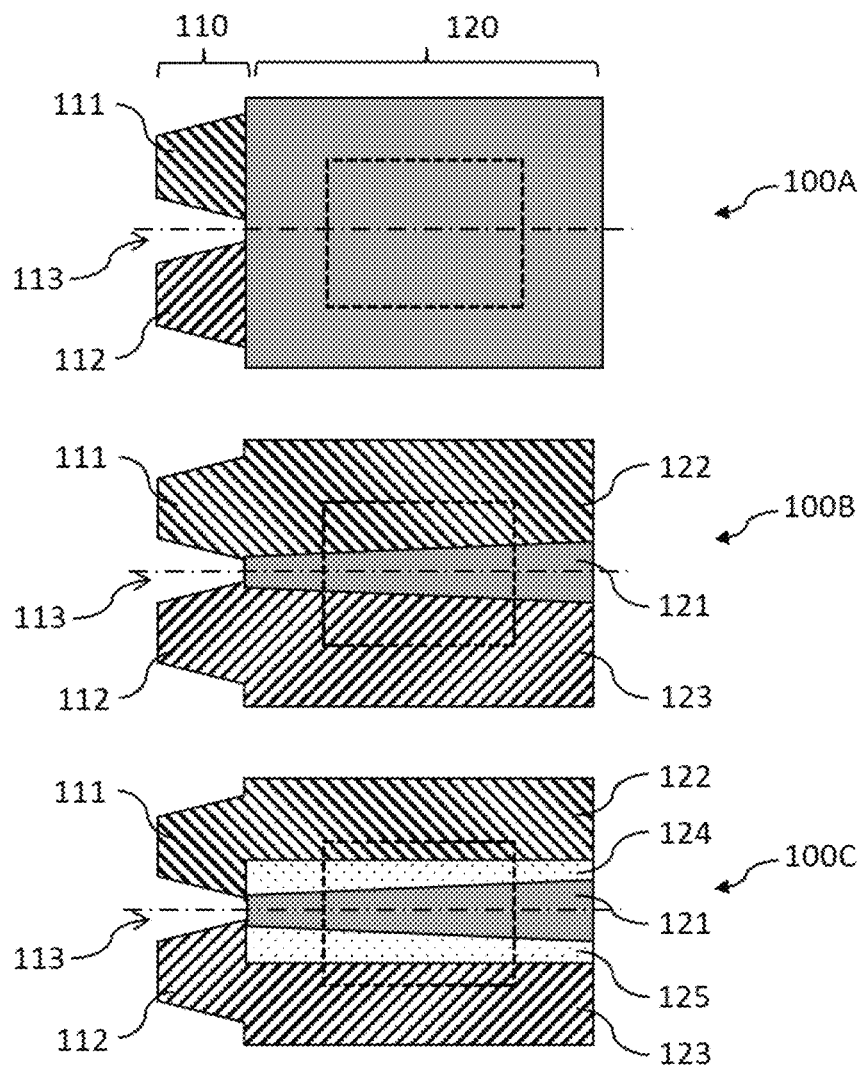
FIG. 12 is a schematic view of different examples of coupling-out gratings that can be used in optical waveguide devices according to embodiments of the present disclosure, where the coupling-out gratings have different grating combinations.

In addition, in the optical waveguide devices according to embodiments of the present disclosure, the coupling-out gratings can have different combinations of gratings. FIG. 12 schematically shows a preferred example of the combination of gratings in the coupling-out grating, which is beneficial for improving light coupling-out efficiency and uniformity.

In a coupling-out grating 100A shown in FIG. 12, a first one-dimensional grating is formed in a first grating area 111, a second one-dimensional grating is formed in a second grating area 112, and a grating vector of the first one-dimensional grating and a grating vector of the second one-dimensional grating are inclined toward mutually opposite directions with respect to the input direction. With the first grating area 111 and the second grating area 112 adopting the above-mentioned one-dimensional grating, light splitting effect toward one lateral side can be strengthened and the coupling-out of light to the outside of the waveguide substrate can be suppressed in these two areas, reducing the loss of light energy, thereby improving the coupling-out efficiency of the optical waveguide device.

In a coupling-out grating 100B shown in FIG. 12, a coupling-out end is divided into, in the width direction, a first coupling-out area 121 located in the middle, a second coupling-out area 122 and a third coupling-out area 123 on both sides thereof, wherein the first coupling-out area 121 is formed with a two-dimensional grating, and the second coupling-out area 122 and the third coupling-out area 123 are formed with the same gratings as those in the first grating area 111 and the second grating area 112 of the receiving end, respectively. For example, the first one-dimensional grating and the second one-dimensional grating described above with reference to the coupling-out grating 100A can be formed in the second coupling-out area 122 and the first grating area 111 and in the third coupling-out area 123 and the second grating area 112, respectively. Or, in another implementation, a first modulated two-dimensional grating is formed in the second coupling-out area 122 and the first grating area 111, and a second modulated two-dimensional grating is formed in the third coupling-out area 123 and the second grating area 112. The first modulated two-dimensional grating and the second modulated two-dimensional grating each have the same grating vectors as the two-dimensional grating in the first coupling-out area 121, but the ability of the first modulated two-dimensional grating to split light toward the third coupling-out area 123 is stronger than that toward the opposite side, while similarly, the ability of the second modulated two-dimensional grating to split light toward the second coupling-out area 122 is stronger than toward the opposite side.

In a coupling-out grating 100C shown in FIG. 12, the coupling-out end is divided into, in the width direction, a first coupling-out area 121 located in the middle, a second coupling-out area 122 and a third coupling-out area 123 located at the outermost sides, a fourth coupling-out area 124 between the first coupling-out area 121 and the second coupling-out area 122, and a fifth coupling-out area 125 between the first coupling-out area 121 and the third coupling-out area 123. Preferably, the first one-dimensional grating and the second one-dimensional grating described above with reference to the coupling-out grating 100A are formed in the second coupling-out area 122 and the first grating area 111 and in the third coupling-out area 123 and the second grating area 112, respectively. A first modulated two-dimensional grating is formed in the fourth coupling-out area 124, a second modulated two-dimensional grating is formed in the fifth coupling-out area 125, and the first modulated two-dimensional grating and the second modulated two-dimensional grating each have the same grating vectors as the two-dimensional grating in the first coupling-out area 121, but the ability of the first modulated two-dimensional grating to split light toward the third coupling-out area 123 is stronger than that toward the opposite side, which similarly, the ability of the second modulated two-dimensional grating to split light toward the second coupling-out area 122 is stronger than toward the opposite side.

In the optical waveguide device according to Embodiment 1 of the present disclosure, the sides of the rectangular eyebox EB are roughly parallel to the input direction. However, the disclosure is not limited to this parallel case. Next, an optical waveguide device according to Embodiment 2 of the present disclosure will be described with reference to FIG. 13 to FIG. 16, wherein the sides of the rectangular eyebox EB are not parallel to the input direction.

Figure 13:
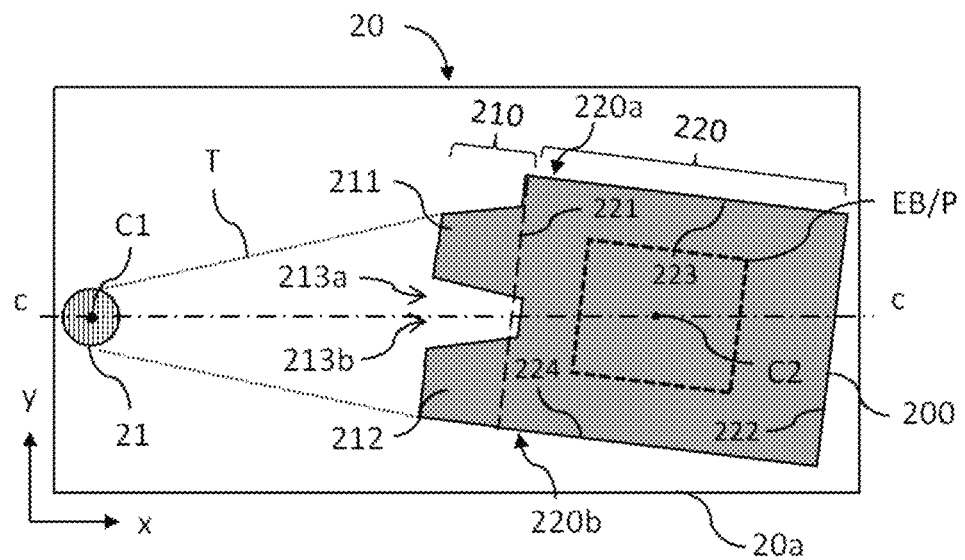
FIG. 13 is a schematic view of an example of an optical waveguide device for image display according to Embodiment 2 of the present disclosure.

FIG. 13 is a schematic view of an example of an optical waveguide device for image display according to Embodiment 2 of the present disclosure. As shown in FIG. 13, an optical waveguide device 20 according to Embodiment 2 comprises a waveguide substrate 20a and a coupling-in grating 21 and a coupling-out grating 200 provided on the waveguide substrate 20a.

The coupling-in grating 21 is configured to couple light carrying image information into the waveguide substrate 20a so that it propagates through total internal reflection. The light propagates to the coupling-out grating 200 along a total reflection propagation path T that gradually diverges relative to a centerline c-c in a plane of the waveguide substrate 20a.

The coupling-out grating 200 is used to couple at least a portion of the light, which propagates thereinto from the coupling-in grating 21 along an input direction (x direction shown in the figure), out of the waveguide substrate 20a by diffraction. Here, the "input direction" can be determined according to the centerline c-c of the total reflection propagation path along which the light propagates to the coupling-out grating.

According to embodiments of the present disclosure, the coupling-out grating 200 has a receiving end 210 located upstream and a coupling-out end 220 located downstream along the input direction (x direction). The receiving end 210 is used to receive light from the coupling-in grating 21 and guide the light to propagate to the coupling-out end 220, and the coupling-out end is used to couple the light toward an eyebox EB while guiding the propagation of the light. As shown in FIG. 13, according to embodiments of the present disclosure, the receiving end 210 is divided into three areas, these three areas comprise a first grating area 211, a second grating area 212, and a blank area 213 between the first grating area 211 and the second grating area 212 in a width direction (y direction) perpendicular to the input direction.

According to embodiments of the present disclosure, as the receiving end 210 of the coupling-out grating 200 is divided into three areas: the first grating area 211, the second grating area 212, and the blank area 213, and the blank area 213 is set between the first grating area 211 and the second grating area 211, the light in the central part of the total reflection propagation path will enter the coupling-out grating 200 through the blank area 213 when light from the coupling-in grating 21 is received by the coupling-out grating 200. As shown in FIG. 13, the centerline c-c of the total reflection propagation path T passes through the blank area 213.

As same as in the optical waveguide device 10 according to Embodiment 1 of the present disclosure, in the optical waveguide device 20, the setting of the blank area can prevent the light in the central part from being prematurely diffracted and split by the coupling-out grating, which causes a considerable amount of light energy being lost, thereby maximizing coupling-out efficiency, and improving the optical effect of the optical waveguide device.

In the example shown in FIG. 13, the eyebox EB is projected on the coupling-out grating 200 to obtain an eyebox projection area P (in the figure, the eyebox EB and its eyebox projection area P are coincident), and a center connecting line C1-C2 connecting a center C1 of the coupling-in grating 21 and a center C2 of the coupling-out end 120 or the eyebox projection area P passes through the blank area 213. According to the range of field of view angle of the image to be displayed, the center connecting line C1-C2 may coincide or substantially coincide with the centerline c-c.

In the example shown in FIG. 13, the blank area 213 is divided into a first blank area 213a close to the first grating area 211 and a second blank area 213b close to the second grating area 212 by taking the center connecting line C1-C2 as a dividing line. Preferably, the average width of the first blank area 213a is larger than the average width of the second blank area 213b, and in the input direction (x direction), the position of the first grating area 211 is offset backward (downstream) relative to the second grating area 212.

In the example shown in FIG. 13, the coupling-out end 220 of the coupling-out grating 200 has a roughly rectangular shape, the rectangular has two top sides 221, 222 located upstream and downstream along the input direction, two lateral sides 223, 224 connecting between the two top sides 221, 222, and a first corner 220a and a second corner 220b located upstream along the input direction; the coupling-out grating 200 is configured in such a way that the lateral sides 223, 224 of the rectangular are inclined relative to the input direction so that the first corner 220a of the rectangular close to the first grating area 211 is farther away from the center connecting line C1-C2 than the second corner 220b of the rectangular close to the second grating area 212. Preferably, the average width of the first blank area 213a close to the first grating area 211 is larger than the average width of the second blank area 213b close to the second grating area 212.

Preferably, the receiving end 210 has a width gradually increasing along the input direction (x direction). In particular, the outer edge of the receiving end 210 substantially coincides with the edge of the total reflection propagation path T or is slightly shifted outward (with a wider width) relative to the latter, so that it can effectively receive light from the coupled-in grating, and at the same time reduce the area of the grating and thus the manufacturing cost.

In addition, the receiving end 210 has a top end (an end facing the coupling-in grating 21) located upstream and a bottom end (an end adjoining to the coupling-out end) located downstream along the input direction (x direction); and preferably, as shown in FIG. 13, the width of the bottom end of the receiving end 210 is smaller than the width of the coupling-out end 220. In this way, the grating area in the coupling-out grating 200 that is not useful for desired image display, can be reduced as much as possible, thereby reducing the manufacturing cost of the optical waveguide device.

Similar to Embodiment 1, in the optical waveguide device according to Embodiment 2, by further controlling the width ratio of the blank area in the receiving end, the coupling-out efficiency of light at different positions in the eyebox and the uniformity of light intensity distribution of the observed image can be adjusted. Advantageously, the blank area has a first average width in the width direction (y direction shown in the figure), the receiving end has a second average width in the width direction, and the first average width is less than 50% of the second average width. Preferably, the first average width is in the range of 15% to 40% of the second average width. Preferably, the blank area has a width that decreases along the input direction.

Figure 14:
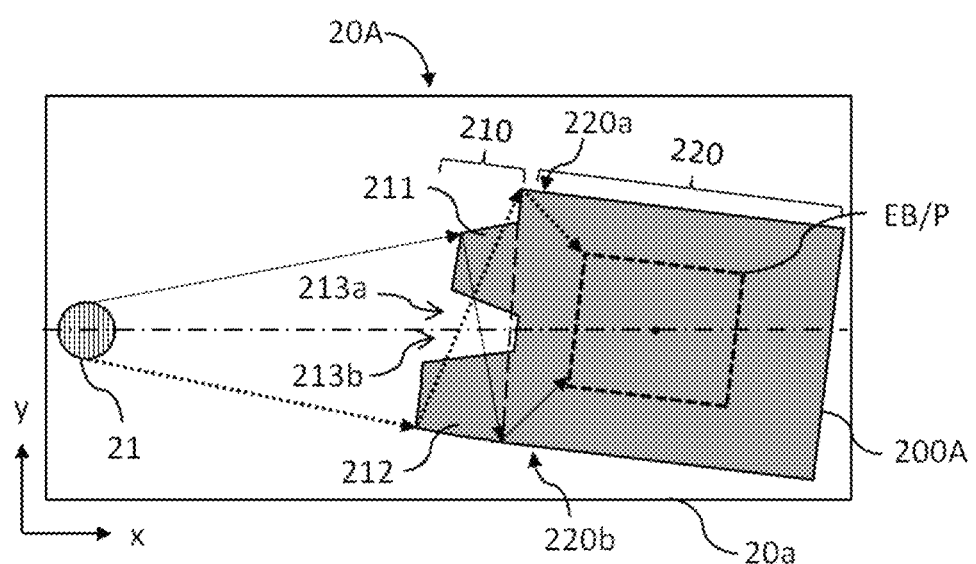
FIG. 14 is a schematic view of another example of the optical waveguide device for image display according to Embodiment 2 of the present disclosure.

FIG. 14 is a schematic view of another example of the optical waveguide device for image display according to Embodiment 2 of the present disclosure. The optical waveguide device 20A shown in FIG. 14 has basically the same structure as the optical waveguide device 20 shown in FIG. 13, and the difference lies in that: in the optical waveguide device 20A, the receiving end 210 is further optimized according to the propagation path of light in the coupling-out grating, so that in the input direction, the length of the first grating area 211 is smaller than the length of the second grating area 212.

Similar to the optical waveguide device according to Embodiment 1 of the present disclosure, the blank area at the receiving end of the coupling-out grating in the optical waveguide device according to Embodiment 2 can have different shapes and lengths, and the coupling-out grating can have different combinations of grating. For illustrative purposes only, FIGS. 15 and 16 show two other examples of the optical waveguide device according to Embodiment 2 of the present disclosure, that is optical waveguide devices 20B and 20C.

Figure 15:
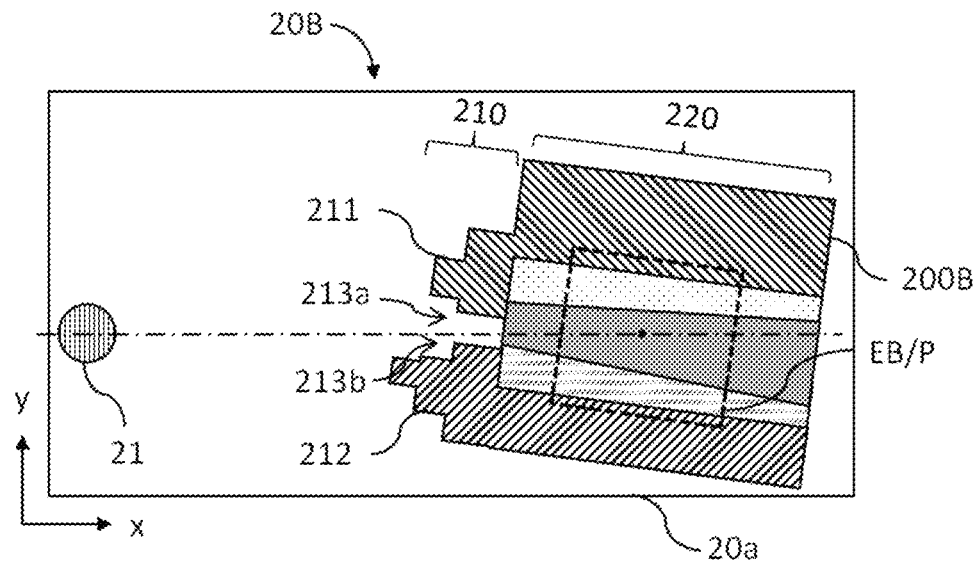
FIG. 15 is a schematic view of yet another example of the optical waveguide device for image display according to Embodiment 2 of the present disclosure.

In the example shown in FIG. 15, the blank area 213 has a shape with stepped sides. Furthermore, it is seen that the outer edge of the receiving end 210 can also be stepped.

Figure 16:
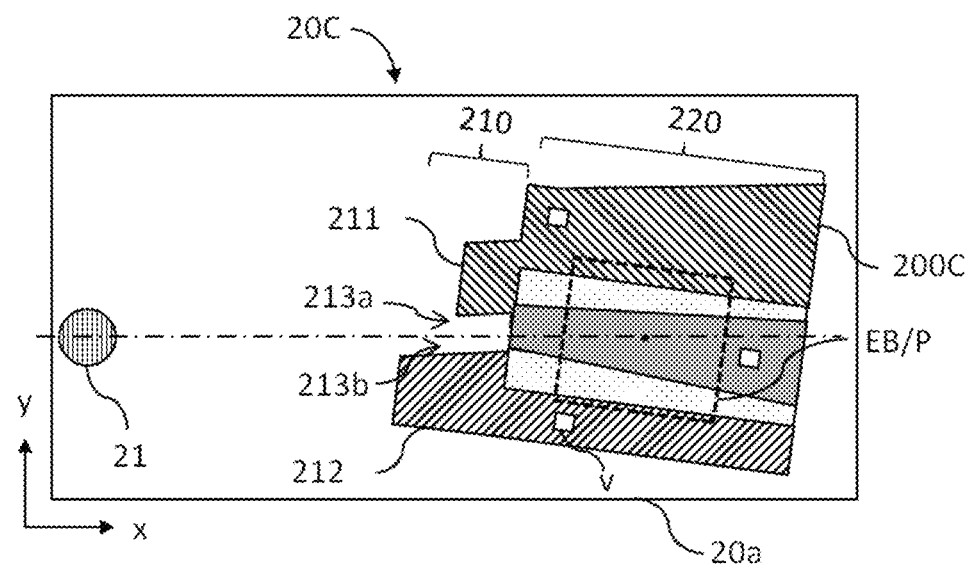
FIG. 16 is a schematic view of yet another example of the optical waveguide device for image display according to Embodiment 2 of the present disclosure.

It can be seen in the example shown in FIG. 16 that the shape of the coupling-out end of the coupling-out grating is not limited to the rectangle shown in the figures introduced above, but may be asymmetrical, and may be a quadrilateral shape other than a rectangle. Especially when no side of the eyebox EB is parallel to the input direction, this asymmetric coupling-out end shape is advantageous. When the optical waveguide device is used for image display with a large field of view or a large eyebox, the non-rectangular shape of the coupling-out end 220 can be determined according to the position of the light propagation path corresponding to the maximum field of view angle FOVX on both sides.

Only as an example, a coupling-out grating 200B shown in FIG. 15 and a coupling-out grating 200C shown in FIG. 16 adopt the same combination of gratings as that in the coupling-out grating 100C shown in FIG. 12; but they can alternatively use other combinations of gratings, which will not be repeated here.

In addition, as shown in FIG. 16, in the optical waveguide device according to embodiments of the present disclosure, micro void areas v without a grating structure can be set in different areas of the coupling-out grating to help adjust light propagation and coupling-out efficiency in different areas, thereby achieving desired coupling-out efficiency and uniformity. This kind of micro void areas v can also be applied in the coupling-out grating of the optical waveguide device according to other embodiments of the present disclosure. However, it will be understood that, there are substantive differences in size, setting position, and function between such micro void area and the blank area 113, 213 set at the middle position of the receiving end of the coupling-out grating according to embodiments of the present disclosure. Specifically, in the optical waveguide device according to embodiments of the present disclosure, the blank area is set at the roughly middle position of the receiving end that is not used for coupling light out to the eyebox, and the size can be determined according to the incident beam of the optical waveguide device, and usually can have a size significantly larger than the size of the pupil area of the human eye, so as to eliminate the loss of light energy caused by the splitting and coupling-out of the light from the coupling-in grating which is at the central position of the total reflection propagation path. The size of a micro void area is generally controlled below the pupil area of the human eye, usually less than 2 mm×2 mm, for if it is too large, the missing area of grating in the void area will be too large, which will affect the experience of human eye. Further, micro void areas have a relatively random position distribution are generally plural in number, and have a distribution density which usually decreases along the input direction. The micro void area is not set for the light in the center of the total reflection propagation path, and not specifically used to reduce the splitting loss of this part of light.

Figure 17:
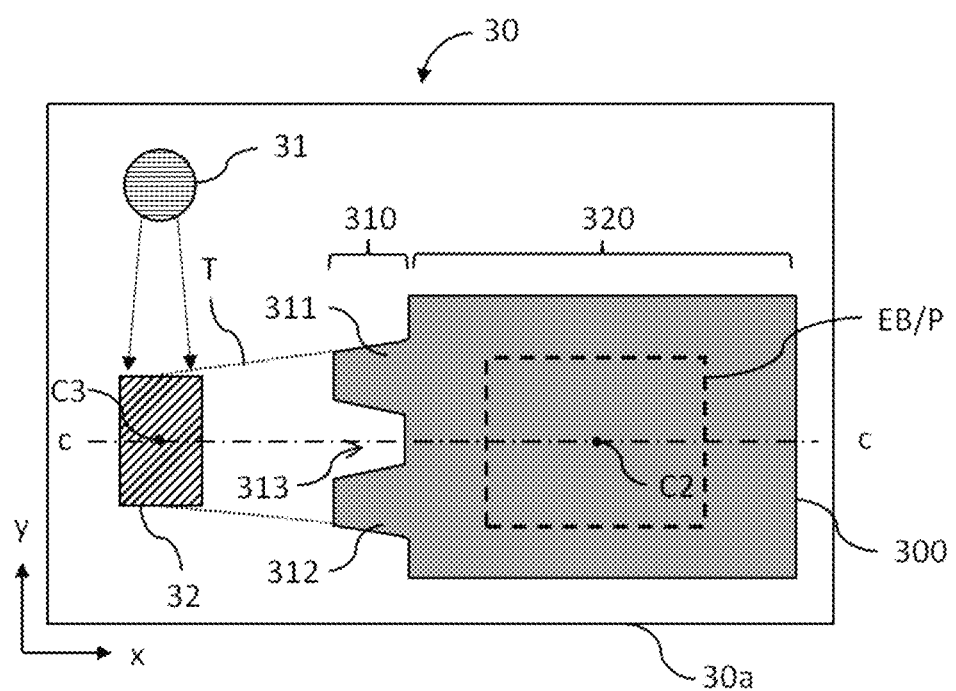
FIG. 17 is a schematic view of an example of an optical waveguide device for image display according to Embodiment 3 of the present disclosure.

Finally, an optical waveguide device according to Embodiment 3 of the present disclosure will be introduced with reference to FIG. 17. As shown in FIG. 17, an optical waveguide device 30 according to the Embodiment 3 of the present disclosure has basically the same structure as the optical waveguide device 10 according to the first embodiment of the present disclosure, wherein the optical waveguide device 30 comprises a waveguide substrate 30a and a coupling-in grating 31 and a coupling-out grating 300 provided on the waveguide substrate 30a; the coupling-out grating 300 has a receiving end 310 and a coupling-out end 320, and the receiving end 310 is divided into a first grating area 311, a second grating area 312, and a blank area 313 between them. The difference between the optical waveguide device 30 and the optical waveguide device 10 lies in that: the optical waveguide device 30 further comprises a deflection grating 32, and the light from the coupling-in grating 31 propagates to the coupling-out grating 300 via the deflection grating 32.

As shown in FIG. 17, the input light propagates to the coupling-out grating 300 along a total reflection propagation path T that gradually diverges relative to a centerline c-c in a plane of the waveguide substrate 30a, and the centerline c-c (coincident with a center connecting line C2-C3 connecting a center of the deflection grating C3 and a center of the coupling-out end C2, in the example shown in FIG. 17) passes through the blank area 313.

The optical waveguide device according to embodiments of the present disclosure can be applied in a display device.

Such a display device is, for example, a near-eye display device, which comprises a lens and a frame for holding the lens close to the eye, wherein the lens may comprise the optical waveguide device according to embodiments of the present disclosure as described above. Preferably, the display device may be an augmented reality display device or a virtual reality display device.

As discussed above with reference to the illustration of the figures, the followings are provided in this application:

(1) An optical waveguide device for image display, comprising a waveguide substrate and a coupling-in grating and a coupling-out grating provided on the waveguide substrate, wherein, the coupling-in grating is configured to couple light carrying image information into the waveguide substrate so that it can propagate through total internal reflection;

the coupling-out grating is used to couple at least a portion of light, which propagates thereinto from the coupling-in grating along an input direction directly or through a deflection grating, out of the waveguide substrate by diffraction, and has a receiving end located upstream along the input direction and a coupling-out end located downstream along the input direction, the receiving end is used to receive the light from the coupling-in grating and guide the light to propagate to the coupling-out end, and the coupling-out end is used to couple out the light toward an eyebox while guiding the propagation of the light, wherein the receiving end is divided into three areas, and the three areas comprise a first grating area, a second grating area, and a blank area between the first grating area and the second grating area in a width direction perpendicular to the input direction.

(2) The optical waveguide device of item (1), wherein an eyebox projection area is obtained by projecting the eyebox onto the coupling-out grating, and the light from the coupling-in grating propagates to the coupling-out grating directly or via the deflection grating, wherein: when the light from the coupling-in grating propagates to the coupling-out grating via the deflection grating, a center connecting line connecting a center of the deflection grating and a center of the coupling-out end or the eyebox projection area passes through the blank area; and when the light from the coupling-in grating directly propagates to the coupling-out grating, a center connecting line connecting a center of the coupling-in grating and a center of the coupling-out end or the eyebox projection area passes through the blank area.

(3) The optical waveguide device of item (1), wherein the blank area has a first average width in the width direction, the receiving end has a second average width in the width direction, and the first average width is less than 50% of the second average width.

(4) The optical waveguide device of item (3), wherein the first average width is in a range of 15%~40% of the second average width.

(5) The optical waveguide device of item (1), wherein the blank area has a width that decreases along the input direction.

(6) The optical waveguide device of item (1), wherein the blank area has a shape of a rectangle, a trapezoid, a triangle, or a shape with stepped sides.

(7) The optical waveguide device of item (1), wherein the first grating area and the second grating area are separated from each other so that the blank area is open to the light from the coupling-in grating.

(8) The optical waveguide device of item (2), wherein the coupling-in grating is substantially centered with respect to the coupling-out end of the coupling-out grating, and the first grating area and the second grating area are symmetrical about the center connecting line.

(9) The optical waveguide device of item (2), wherein the coupling-out end of the coupling-out grating has a substantially quadrilateral shape, the quadrilateral shape has two top sides located upstream and downstream along the input direction, two lateral sides connecting between the two top sides, and a first corner and a second corner located upstream along the input direction, and the coupling-out grating is configured in such a way that the lateral sides of the quadrilateral shape are inclined relative to the input direction so that the first corner of the quadrilateral shape close to the first grating area is farther away from the center connecting line than the second corner of the quadrilateral shape close to the second grating area.

(10) The optical waveguide device of item (9), wherein, taking the center connecting line as a dividing line, the blank area is divided into a first blank area close to the first grating area and a second blank area close to the second grating area, and an average width of the first blank area is greater than an average width of the second blank area.

(11) The optical waveguide device of item (9), wherein, in the input direction, a length of the first grating area is smaller than a length of the second grating area.

(12) The optical waveguide device of item (1), wherein light propagates to the coupling-out grating along a total reflection propagation path that gradually diverges relative to a centerline in a plane of the waveguide substrate, and the centerline is parallel to the input direction and passes through the blank area.

(13) The optical waveguide device of item (12), wherein the coupling-in grating is substantially centered with respect to the coupling-out end of the coupling-out grating, and the first grating area and the second grating area are symmetrical about the centerline.

(14) The optical waveguide device of item (2), wherein, taking the center connecting line as a dividing line, the blank area is divided into a first blank area close to the first grating area and a second blank area close to the second grating area, an average width of the first blank area is greater than an average width of the second blank area, and the position of the first grating area is offset backward relative to the second grating area in the input direction.

(15) The optical waveguide device of any one of items (1)-(14), wherein the receiving end has a width which gradually increases along the input direction.

(16) The optical waveguide device of item (15), wherein the receiving end has a top end located upstream and a bottom end located downstream along the input direction, and a width of the bottom end is smaller than a width of the coupling-out end.

(17) The optical waveguide device of any one of items (1)-(14), wherein a first one-dimensional grating is formed in the first grating area, a second one-dimensional grating is formed in the second grating area, and a grating vector of the first one-dimensional grating and a grating vector of the second one-dimensional grating are inclined toward mutually opposite directions with respect to the input direction.

(18) The optical waveguide device of any one of items (1)-(14), wherein the coupling-in grating is a one-dimensional grating.

(19) A display device comprising the optical waveguide device of any one of items (1)-(18).

(20) The display device of item (19), wherein the display device is a near-eye display device and comprises a lens and a frame for holding the lens close to the eye, the lens comprising the optical waveguide device.

(21) The display device of item (19) or (20), wherein the display device is an augmented reality display device or a virtual reality display device.

The above description is merely an illustration of the preferred embodiments of the present application and the applied technical principles. Those skilled in the art should understand that the scope of the disclosure involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. An optical waveguide device for image display, comprising a waveguide substrate and a coupling-in grating and a coupling-out grating provided on the waveguide substrate, wherein, the coupling-in grating is configured to couple light carrying image information into the waveguide substrate so that it can propagate through total internal reflection;

the coupling-out grating is used to couple at least a portion of light, which propagates thereinto from the coupling-in grating along an input direction directly or through a deflection grating, out of the waveguide substrate by diffraction, and has a receiving end located upstream along the input direction and a coupling-out end located downstream along the input direction, the receiving end is used to receive the light from the coupling-in grating and guide the light to propagate to the coupling-out end, and the coupling-out end is used to couple out the light toward an eyebox while guiding the propagation of the light, wherein the receiving end is divided into three areas, which comprise a first grating area, a second grating area, and a blank area between the first grating area and the second grating area in a width direction perpendicular to the input direction, the blank area is used for receiving light at a middle position of the light from the coupling-in grating, and the first grating area and the second grating area are used for receiving light at lateral positions of the light from the coupling-in grating;

wherein light propagates to the coupling-out grating along a total reflection propagation path that gradually diverges relative to a centerline in a plane of the waveguide substrate, and the centerline is parallel to the input direction and passes through the blank area; the coupling-in grating does not intersect any portion of a line perpendicular to the center line that also intersects the coupling-out grating; and the centerline does not intersect the first grating area and the second grating area.

2. The optical waveguide device of claim 1, wherein an eyebox projection area is obtained by projecting the eyebox onto the coupling-out grating, and the light from the coupling-in grating propagates to the coupling-out grating directly or via the deflection grating, wherein: when the light from the coupling-in grating propagates to the coupling-out grating via the deflection grating, a center connecting line connecting a center of the deflection grating and a center of the coupling-out end or the eyebox projection area passes through the blank area; and when the light from the coupling-in grating directly propagates to the coupling-out grating, a center connecting line connecting a center of the coupling-in grating and a center of the coupling-out end or the eyebox projection area passes through the blank area.

3. The optical waveguide device of claim 1, wherein the blank area has a first average width in the width direction, the receiving end has a second average width in the width direction, and the first average width is less than 50% of the second average width.

4. The optical waveguide device of claim 3, wherein the first average width is in a range of 15%~40% of the second average width.

5. The optical waveguide device of claim 1, wherein the blank area has a width that decreases along the input direction.

6. The optical waveguide device of claim 1, wherein the blank area has a shape of a rectangle, a trapezoid, a triangle, or a shape with stepped sides.

7. The optical waveguide device of claim 1, wherein the first grating area and the second grating area are separated from each other so that the blank area is open to the light from the coupling-in grating.

8. The optical waveguide device of claim 2, wherein the coupling-in grating is centered with respect to the coupling-out end of the coupling-out grating, and the first grating area and the second grating area are symmetrical about the center connecting line.

9. The optical waveguide device of claim 2, wherein the coupling-out end of the coupling-out grating has a quadrilateral shape, the quadrilateral shape has two top sides located upstream and downstream along the input direction, two lateral sides connecting between the two top sides, and a first corner and a second corner located upstream along the input direction, and the coupling-out grating is configured in such a way that the lateral sides of the quadrilateral shape are inclined relative to the input direction so that the first corner of the quadrilateral shape close to the first grating area is farther away from the center connecting line than the second corner of the quadrilateral shape close to the second grating area.

10. The optical waveguide device of claim 9, wherein, taking the center connecting line as a dividing line, the blank area is divided into a first blank area close to the first grating area and a second blank area close to the second grating area, and an average width of the first blank area is greater than an average width of the second blank area.

11. The optical waveguide device of claim 9, wherein, in the input direction, a length of the first grating area is smaller than a length of the second grating area.

12. The optical waveguide device of claim 1, wherein the coupling-in grating is centered with respect to the coupling-out end of the coupling-out grating, and the first grating area and the second grating area are symmetrical about the centerline.

13. The optical waveguide device of claim 2, wherein, taking the center connecting line as a dividing line, the blank area is divided into a first blank area close to the first grating area and a second blank area close to the second grating area, an average width of the first blank area is greater than an average width of the second blank area, and the position of the first grating area is offset backward relative to the second grating area in the input direction.

14. The optical waveguide device of claim 1, wherein the receiving end has a width which gradually increases along the input direction.

15. The optical waveguide device of claim 14, wherein the receiving end has a top end located upstream and a bottom end located downstream along the input direction, and a width of the bottom end is smaller than a width of the coupling-out end.

16. The optical waveguide device of claim 1, wherein a first one-dimensional grating is formed in the first grating area, a second one-dimensional grating is formed in the second grating area, and a grating vector of the first one-dimensional grating and a grating vector of the second one-dimensional grating are inclined toward mutually opposite directions with respect to the input direction.

17. The optical waveguide device of claim 1, wherein the coupling-in grating is a one-dimensional grating.

18. A display device comprising the optical waveguide device of claim 1.

* * * * *